(No Model.) 3 Sheets—Sheet 1.
E. WHITE.
FRUIT EVAPORATOR.
No. 378,483. Patented Feb. 28, 1888.
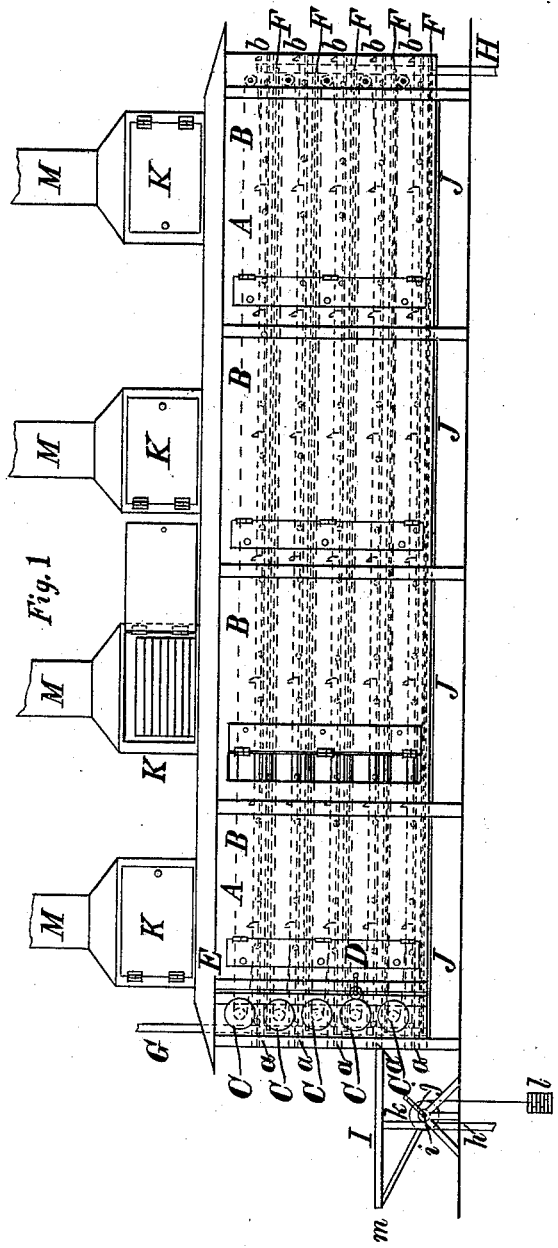
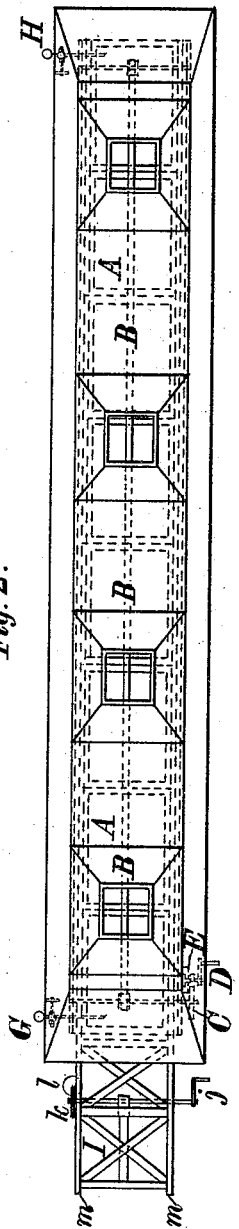
Witnesses
O. W. Allison,
H. G. Philips.
Inventor,
Eli White.
By his Attorney,
A. Sorge Jr.

(No Model.) 3 Sheets—Sheet 2.

E. WHITE.
FRUIT EVAPORATOR.

No. 378,483. Patented Feb. 28, 1888.

Witnesses
O. W. Allison.
H. G. Phillips.

Inventor,
Eli White.
By his Attorney.
A. Sorge Jr.

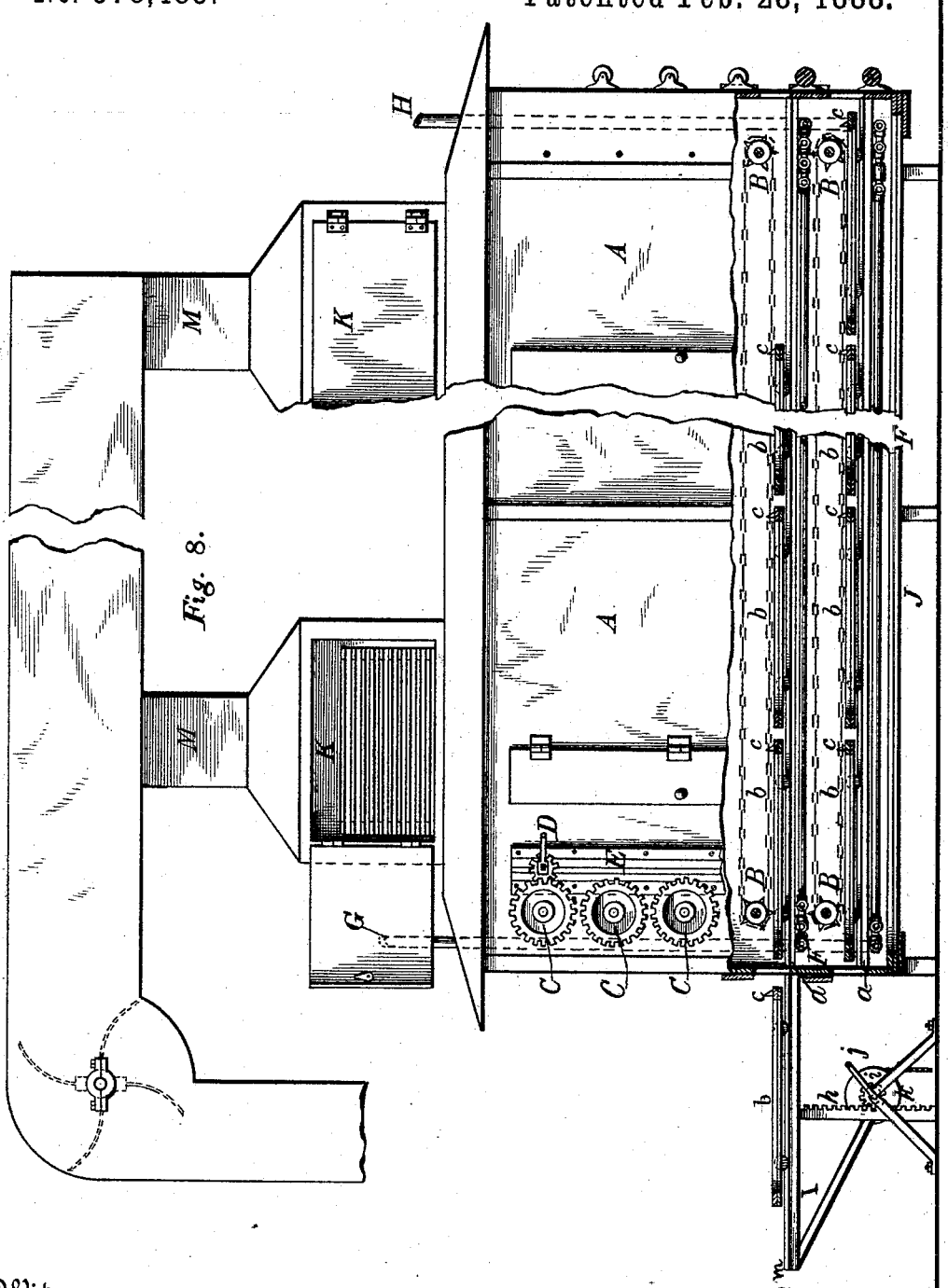

UNITED STATES PATENT OFFICE.

ELI WHITE, OF MOUNT MORRIS, NEW YORK.

FRUIT-EVAPORATOR.

SPECIFICATION forming part of Letters Patent No. 378,483, dated February 28, 1888.

Application filed September 18, 1886. Serial No. 213,939. (No model.)

*To all whom it may concern:*

Be it known that I, ELI WHITE, a citizen of the United States, residing at Mount Morris, in the county of Livingston and State of New York, have invented certain Improvements in Fruit-Evaporators, of which the following is a specification, reference being had to the accompanying drawings.

My invention relates to certain improvements in fruit-evaporators which enable me to dry or evaporate fruit continuously and in a very short time, and to do so with a small expenditure for fuel; and this improved machinery is fully described and illustrated in the following specification and the accompanying drawings, and the novel features thereof specified in the claims annexed to the said specification.

Figure 3:
Figure 4:
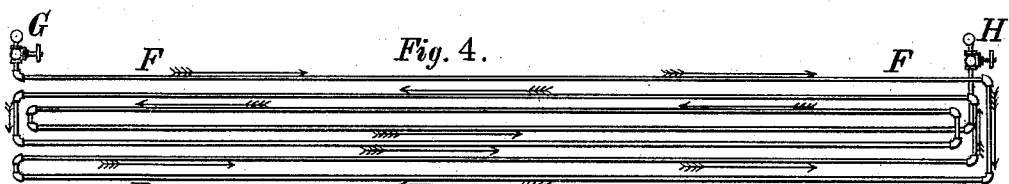
Figure 5:
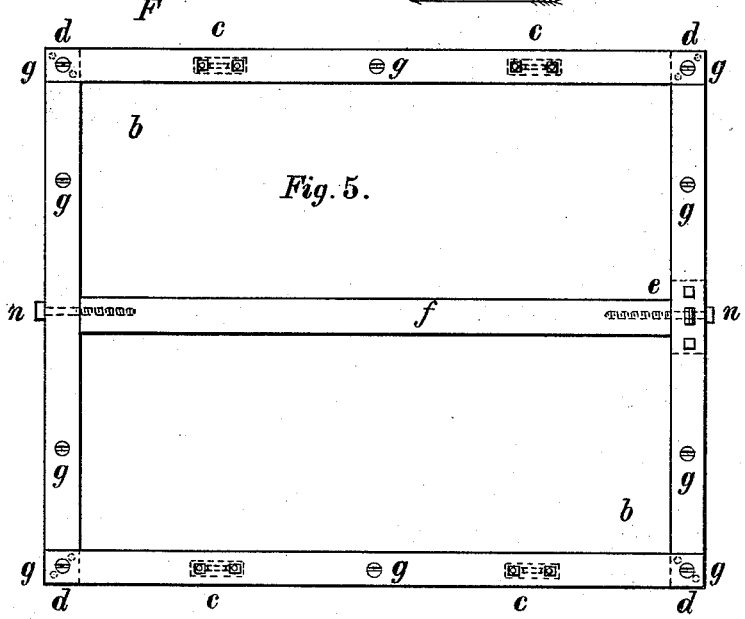
Figure 6:
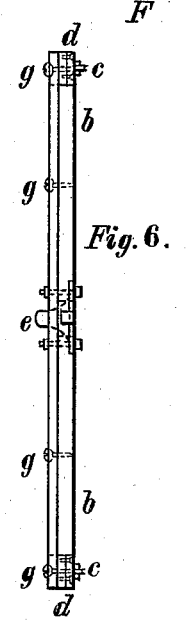
Figure 7:

In the accompanying drawings, representing my improvements in fruit-evaporators, Figure 1 is a side elevation of my apparatus. Fig. 2 is a top view of the same. Figs. 3 and 4 show the arrangement of the steam-coils. Fig. 5 is a plan view of the roller-sprocket sieve. Fig. 6 is an end elevation, and Fig. 7 is a side elevation, of the same. Fig. 8 is a side elevation, the lower portion being shown in section.

In the accompanying drawings, A A represent the housing or frame, provided with doors, as represented in Fig. 1. On the opposite side to the side shown in Fig. 1, and placed at the farther ends of the sections, are doors also, which thus, when opened, give a view of the interior of A A which cannot be obtained through the doors shown. Running the whole length of A A, and supported each side by suitable frames, are the tracks $a\ a\ a\ a$, made of metal or wood. On these tracks run the roller-sprocket sieves $b\ b$, Figs. 1, 2, 5, 6, 7. As shown in Figs. 5, 6, 7, each sieve is held between two frames. The upper frame is a plain rectangular frame formed of four pieces of wood joined together at the corners. The lower frame is formed in the same way, the corners $d$ being held together by small wood-screws, as shown. Running between the two end pieces of the lower frame is a bar of wood, which is fitted into place, and the wood-bolts $n$ are screwed into its ends, first passing through the end pieces of the lower frame. These bolts can be drawn up tightly when required, and the joints of the lower frame thus drawn together. The sieve is placed on this lower frame and the upper frame put above it. The screws $g\ g$ are then passed through the upper frame and screwed into the lower frame, and the two frames thus drawn tightly together, holding the sieve between them.

Rollers $c\ c$, with suitable frames, are firmly attached below the sides of the frame by bolts passing through both frames and provided with nuts on top, thus giving additional stiffness to the whole structure. A sprocket, $e$, is attached in the same way to one of the end pieces of the frame and has its tooth or point projecting above the upper frame.

Link-chains B B, running nearly the whole length inside the housing A A on pulleys attached to suitable shafts, as shown in Figs. 1 and 2, pass over the sieves, or can be arranged to pass under if the sprocket is made to project downward. One chain is provided for each set of sieves, and the sprockets or teeth on the sieves catch in the links of the corresponding chain. At one end of the housing is attached the slide E, in which slides a pinion, D, provided with a crank and a nut for clamping it to the slide. This pinion and crank may be adjusted to gear into any one of the gears C, as may be desired. The gears C are attached to the sprocket-wheel shafts of the link-chains, and by this means any set of sieves may be moved forward or backward on its tracks.

A frame, I, Figs. 1 and 2, has a rack, $h$, attached to it, which gears into a pinion, $i$, attached to a shaft-carrying crank, $j$. This shaft is supported by appropriate journals and has at its farther end a small pulley, $k$, over which a band passes, carrying a counter-weight, $l$. On top of frame I are secured the tracks $m\ m$, which are of exactly the same gage and material as tracks $a$. The counter-weight $l$ is made to exactly counterbalance the weight of the frame, which can thus be readily raised or lowered, so that tracks $m\ m$ shall come in line with the desired track $a$.

Underneath each set of tracks, and therefore below each set of sieves, is placed a coil of steam-pipe, F, through which steam passes from a main supply-pipe, G, and away through a main waste-pipe, H. Each coil is provided with a valve or stop-cock to cut off the supply of steam, as well as another valve or stop-cock to cut off the main waste-pipe. These coils are arranged alternately, as shown in Figs. 3 and 4, and the steam passes through them, as shown by the arrows. This arrangement is substantially reversing the direction of the flow of steam in each coil, and the object is to equalize the heat in the various parts of the housing by first letting steam pass when fresh on one side in one coil and on the opposite side in the next coil. In this manner I equalize the heat throughout, and thereby produce a uniform draft.

Each end of the housing is further provided with doors running the whole width of the housing and equal in number to the number of sets of sieves employed. These doors on the end G are opened when sieves are to be introduced and on the end H when sieves are to be taken out. The bottom of the housing is formed of slats of any desired width, between which spaces are left, so that the bottom looks like a grating.

Under or over this grating, as may be most convenient, slide other gratings, J, of the length of the sections and so spaced that the slats in the sliding gratings J can be made to close up the spaces in the bottom of A A completely. These sliding gratings have handles attached to them, by means of which the operator can open the spaces in the bottom of A A to any desired width, thus forming complete draft regulators or dampers for the whole apparatus.

Drums K K K are placed on top of the housing and the housing is cut away entirely under them, so as to leave a clear access into the bottoms of K K. These drums are provived with doors of the full size of one side, and sieves can be placed in them to utilize the heat passing up through them. From the tops of these drums flues M M lead off into the chimney, or may separately lead into the air to carry off the steam liberated by drying the fruit. In the flues M M, or in the common flue to which they may lead, or in some other appropriate place, a fan or blower of some suitable kind may be placed which shall draw the air from or force it away from the housing, and thus create a greater draft.

In operating my evaporator I place a sieve upon the spreading table or frame I and spread the fruit upon it, the table having just been adjusted to the desired track of the housing. This sieve is now pushed into the housing, the door of which has been opened for this purpose. The next sieve is placed on the table and operated upon in the same manner.

The pinion and crank D are adjusted to make its pinion gear into the appropriate gear C, and the crank is turned, dragging the appropriate chain B B over the sieve and catching on the sprockets, thus moving the first sieve along to make room for the following ones. These operations are repeated until the track is filled up, when the door is closed and the table I and crank D are adjusted to the next tracks, when the same operation is repeated until all the tracks, or as many as may be desired, are filled up. The drums K may now be filled with sieves. Steam is now introduced from the main supply-pipe G into any or all of the coils by opening the respective supply valves or cocks and the respective waste valves or cocks. All the doors are now closed and the draft regulators or dampers J in the bottom of the housing are opened. If fans or blowers are employed, they are now started and regulated to produce the desired amount of draft, which can, however, in some cases, be obtained without the use of a fan or blower.

The coils heat the air passing through the housing and a rapid draft is produced, which carries off the moisture liberated from the fruit by the heat of the steam-coils, and the fruit is dried very rapidly. The doors on the sides of A A may be opened occasionally to inspect the interior.

As rapidly as the fruit is dried the sieves are dragged out by the chains B B and new sieves are introduced, as hereinbefore described.

If desired, the waste-pipe H may lead in a coil underneath the housing, so as to warm the air entering through dampers J.

Only one chain is employed, running over the middle of each set of sieves, as two or more would stretch differently, and thus tend to twist the sieves out of their tracks.

Large rollers may be attached under each set of tracks at the end H, so as to carry the sieves out.

Having now fully described my invention, I claim—

1. In a fruit-evaporator, the combination, with the housing containing a series of ways or tracks for the fruit-sieves and chains or equivalent devices for moving the sieves on any of said ways independently of those on the others, of mechanism for moving said chains, consisting of gear-wheels connected thereto and a movable pinion for engaging any one of said gear-wheels, provided with a crank or handle for rotating it, substantially as described.

2. In a fruit-evaporator, the combination, with the housing containing a series of tracks or ways for the fruit-sieves and chains or equivalent devices for moving the sieves on any of said ways independently of those on the others, of mechanism for moving said chains, consisting of gear-wheels located outside of the casing and connected to said chains, a track or slide, and a pinion mounted thereon for engaging any one of said gear-wheels, and a crank or handle for rotating it, substantially as described.

3. In a fruit-evaporator, a sieve consisting of a lower frame carying a sprocket which projects through the upper frame, an upper frame, the sieve held between the two frames, rollers attached to said frames, and screws and bolts to draw the whole arrangement together, substantially as described.

4. In a fruit-evaporator, a series of fruit-carriers, with a steam-coil arranged beneath each of said carriers, each of said coils having independent connections with a common steam-supply pipe and a common exhaust-pipe, each of the outer pipes of one coil leading from the steam-supply pipe in the opposite direction from that of the corresponding pipes in adjacent coils, whereby the hottest direct steam is alternately thrown on opposite sides of the evaporator, substantially as described.

ELI WHITE.

Witnesses:
 H. G. PHILLIPS,
 A. SORGE, Jr.